Figure 1:
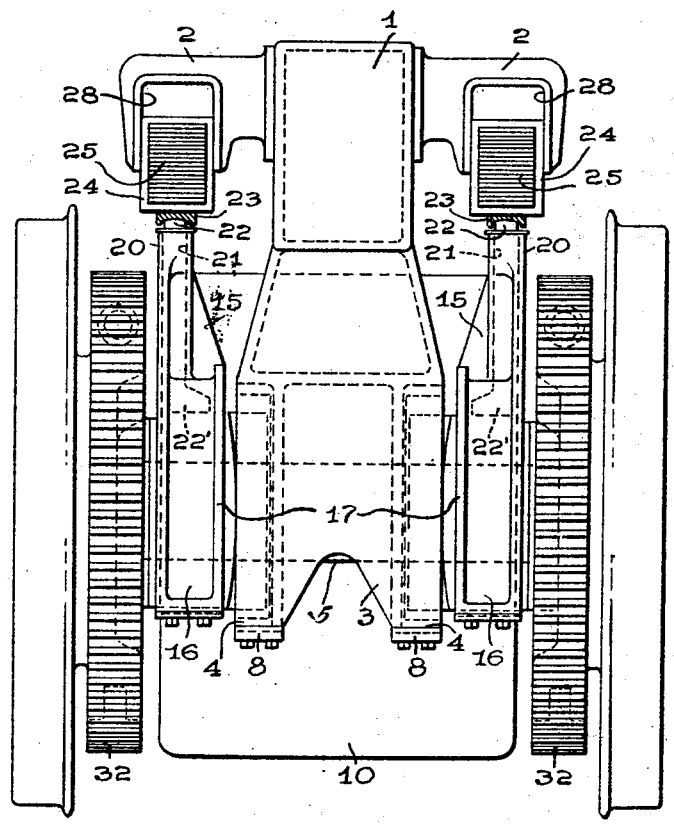

Feb. 2, 1926.

H. A. KJELSBERG 1,571,906

MOTOR SUSPENSION

Original Filed Oct. 27, 1923   3 Sheets-Sheet 1

WITNESSES:

INVENTOR
Harald A. Kjelsberg
BY
ATTORNEY

Feb. 2, 1926. 1,571,906
H. A. KJELSBERG
MOTOR SUSPENSION
Original Filed Oct. 27, 1923 3 Sheets-Sheet 3

WITNESSES:
R. S. Harrison
W. B. Jaspert.

INVENTOR
Harold A. Kjelsberg
BY
Wesley G. Carr
ATTORNEY

Patented Feb. 2, 1926.

1,571,906

UNITED STATES PATENT OFFICE.

HARALD A. KJELSBERG, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR SUSPENSION.

Application filed October 27, 1923, Serial No. 671,170. Renewed January 7, 1926.

*To all whom it may concern:*

Be it known that I, HARALD A. KJELSBERG, a citizen of Switzerland, and a resident of Wilkinsburg, in the county of Allegheny and State of Pennsylvania, have invented a new and useful Improvement in Motor Suspensions, of which the following is a specification.

My invention relates to railway vehicles, more especially to drive mechanisms and motor suspensions for electrically operated locomotives.

It is among the objects of my invention to provide axle-mounted motor suspensions for railway vehicles which shall be of simple, compact and durable mechanical construction comprising a minimum number of parts, which shall provide such a relation of the driving-motor wheel axles and vehicle frame as will permit of relative movement therebetween and which, by virtue of the relative functions of the several co-operating parts, shall avoid the localization of stresses and generally produce a more efficient drive mechanism.

A railway vehicle usually comprises a subframe structure for the vehicle body which is mounted upon one or more wheeled truck members in a manner to provide certain relative movements therebetween, and the drive motors may be associated with the wheel axles of the trucks by suitable geartrain connections. The motors are secured to the truck transoms or frames and are journalled, at one end, on the wheel axles, which type of mounting is usually termed an axle-hung motor mounting.

My present invention is directed to an axle-mounted motor suspension for railway vehicles in which the motors are springborne on the sub-frame of the body, thereby eliminating the usual truck members, and the other ends of the motors are supported on the wheel axles in a novel manner by means of pedestals that are integral with the motor housing and engage the journal boxes of the wheel axles to permit of vertical movement of the motor frame relative to the vehicle sub-frame, wheel axles, and journal boxes.

This type of mounting has the characteristic of securing the motors in a manner that will provide an entirely resilient suspension or mounting, in that the motor may not only be spring-borne on the vehicle frame, but may be resiliently supported on the wheel axles or journal boxes. The advantages of such a design are obvious and highly desirable.

Figure 2:
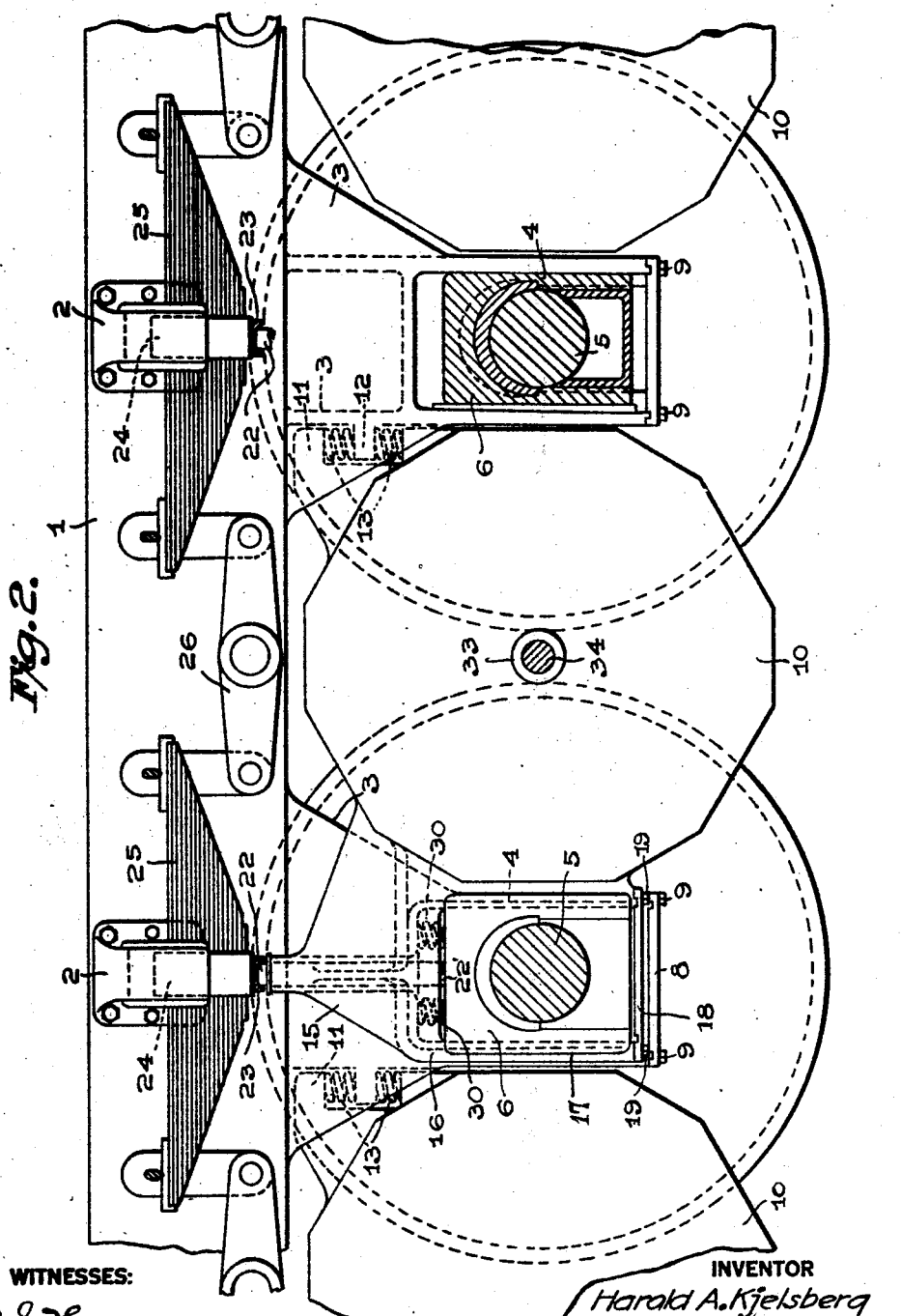
Figure 3:
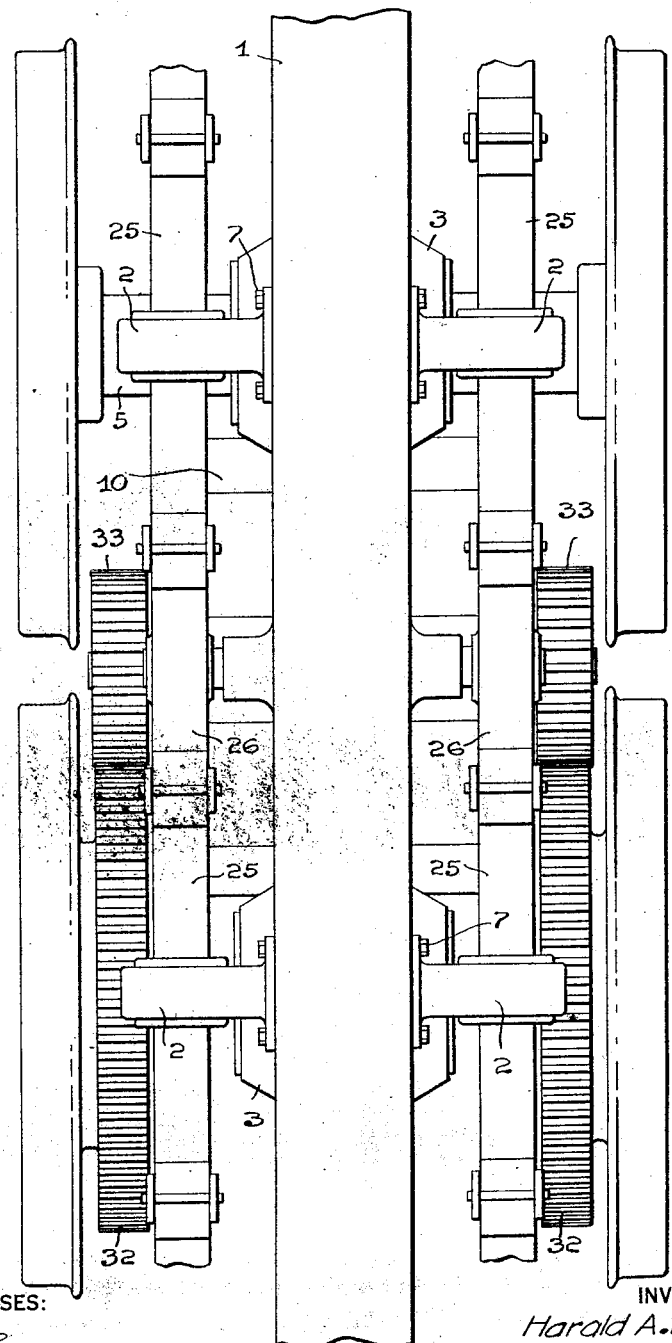

In the accompanying drawings constituting a part hereof and in which like reference characters designate like parts:

Figure 1 is an end-elevational view of a railway vehicle embodying the principles of my invention, Fig. 2 is a side-elevational view of a fragmentary portion of a vehicle frame supported on a plurality of wheeled axles, showing the positions of the driving motors relative to the wheel axles and frame portions, and Fig. 3 is a plan view thereof.

The illustrated vehicle sub-frame comprises a longitudinal girder 1 having transversely disposed ears or lugs 2 and spaced downwardly depending portions 3 constituting the pedestals 4 for the wheel axles 5, which are journalled in the usual drive or journal boxes 6. The lugs 2 may be formed integrally with the longitudinal girder 1 or secured thereto by bolts 7 (Fig. 3) and the pedestal-carrying members may be formed in like manner. The journal boxes 6 are adapted to move vertically between the pedestals 4 and are held in position by pedestal binders 8, which may be secured in any usual manner, as by bolts 9.

Each of a plurality of drive motors 10 has one end mounted upon adjacent portions 3 of the frame member by means of interlocking brackets 11 and projecting lugs 12 of the motor and frame, respectively, and a plurality of helical springs 13 are interposed between the brackets 11 and lugs 12 to provide a spring-borne mounting for the motors on the frame.

The other ends of the motors 10 are severally provided with longitudinally extending brackets 15 having pedestals 16, corresponding to the pedestals 4 of the frame member 3, for engaging the journal boxes 6 on the outside of their flanged portion 17. The motor pedestals 16 are also provided with pedestal binders 18 that are secured by bolts 19. The brackets 15 are provided with web portions 20 extending vertically thereon and having central guide openings 21 that are respectively adapted to receive a plurality of slide rods 22, which extend below the corresponding brackets 15 and rest upon the top of the journal boxes 6. The lower ends of the rods 22 are provided with seating shoes 22' for obtaining even load distribution over the lengths of the boxes 6. The upper ends of the rods 22 respectively engage wearing plates 23 underneath the usual spring clips 24 of the driver springs 25, which are connected by a plurality of equalizer links 26 for effecting a uniform distribution of the vehicle load on the wheel axles. The spring bands or clips 24 are adapted to fit into substantially U-shaped openings 28 of the transverse lugs 2 to maintain the correct lateral position of the springs 25 relative to the girder 1.

The motors 10 are likewise supported on the journal boxes 6, and a plurality of helical springs 30 are interposed between the motor brackets 15 and the journal boxes to provide a resilient support for the motors.

Both ends of the motors are thus spring-borne, the bracket 11 being carried by the depending frame portions 3 and the bracket 15 by the journal boxes 6. The journal-box flanges 17 (Fig. 1) function as separators between the pedestals 4 of the frame member and the pedestals 16 of the motors, thus restraining relative lateral movement of the motors, frames and wheel axles.

The driving connection of the motors 10 with the wheel axles 5 is effected through a plurality of gear-wheels 32, which are mounted on the wheel axles 5, and motor pinions 33, which are secured on the respective ends of the motor shafts 34. The gear-wheels 32 may be of a flexible type, as is common in railway drives.

It is obvious that the weight of the vehicle frame is transmitted through the equalization system, including the driver springs 25, to the rods 22, which rest upon the journal boxes 6, thus assuring uniform distribution of loading on the wheel axles 5. The motors 10, being spring-borne on the vehicle frame at one end and spring-borne on the journal boxes 6 at the other end by means of the pedestal brackets 15, are thus ultimately supported by the wheel axles. The principal feature of this type of mounting is the independent support of the motors on the axles, which permits of relative movement of the axles and the frame member without affecting the tooth mesh of the connecting gear-wheels on the motor shafts and axles. This type of mounting further eliminates the necessity for the side-frame construction heretofore employed, which gives greater access to the motors and the rotating parts.

It is evident from the above description of my invention that axle-mounted motors disposed in accordance therewith provide an efficient and simple drive mechanism which is durable and also accessible for the removal or renewal of parts. The flexibility of the design permits of a wide range of motor spacing, gear-center distances, and positioning of the motors relative to the rails and vehicle frames. The rugged construction of the vehicle pedestals and motor pedestals and the lateral restraining means are features which overcome some of the difficulties of excessive wear caused by nosing of the vehicle and flanging of the wheels on the rails.

Although I have described a specific embodiment of my invention, it will be obvious to those skilled in the art that various changes may be made in the details of construction and the proportions and design of the several co-operating members without departing from the principles herein set forth.

I claim as my invention:—

1. A motor drive for electrically operated railway vehicles comprising a plurality of motors having a resilient connection with the vehicle frame and having pedestal arms adapted to engage the journal boxes of the wheel axles.

2. A motor drive for electrically operated railway vehicles comprising a plurality of motors having a resilient connection with the sub-frame of the vehicle and having pedestal arms adapted to engage the journal boxes of the wheel axles.

3. A motor drive for electrically operated railway vehicles comprising a plurality of motors that are spring-borne on the vehicle frame and are in movable engagement with the journal boxes of the vehicle wheel axles.

4. A motor drive for electrically operated railway vehicles comprising a plurality of motors that are spring-borne on the vehicle frame and are resiliently mounted on the journal boxes of the vehicle wheel axles to permit relative vertical movement of the motors and said axles.

5. A motor drive for electrically operated railway vehicles comprising a plurality of motors each of which is adapted to operate a drive axle, said motors being disposed in tandem relation and movably secured to the vehicle frame and the journal boxes of said axles.

6. The combination with a vehicle frame, of a plurality of drive motors, means for resiliently mounting said motors on the frame and means for resiliently mounting the motors on the journal boxes of the drive axles.

7. The combination with a vehicle frame, of a plurality of drive motors, means for resiliently mounting said motors on the frame and means for resiliently mounting the motors on the journal boxes of the drive axles, said last-named means comprising a plurality of pedestals formed integrally with the motor housings, said housings being adapted to engage the journal boxes, and spring elements disposed between the motor housings and said boxes.

8. The combination with a vehicle frame, of a plurality of drive motors, said motors having integral pedestals for mounting on the journal boxes of the drive axles and brackets for securing them to the vehicle frame, 9. The combination with a vehicle frame, of a plurality of drive motors, said frame being mounted upon the journal boxes of a plurality of wheel axles and said motors having a pedestal connection with the said boxes.

In testimony whereof, I have hereunto subscribed my name this 20th day of October 1923.

HARALD A. KJELSBERG.